(12) United States Patent
Cherepanov et al.

(10) Patent No.: US 10,225,334 B2
(45) Date of Patent: Mar. 5, 2019

(54) SYSTEM AND METHOD FOR ESTIMATING DISTRIBUTED CONSUMPTION OF A QUOTA

(71) Applicant: RingCentral, Inc., Belmont, CA (US)

(72) Inventors: Dmitry Sergeevich Cherepanov, St. Petersburg (RU); Ilya Vladimirovich Mikhailov, St. Petersburg (RU)

(73) Assignee: RingCentral, Inc., Belmont, CA (US)

( * ) Notice: Subject to any disclaimer, the term of this patent is extended or adjusted under 35 U.S.C. 154(b) by 234 days.

(21) Appl. No.: 15/224,424

(22) Filed: Jul. 29, 2016

(65) Prior Publication Data

US 2017/0187794 A1   Jun. 29, 2017

Related U.S. Application Data

(63) Continuation of application No. PCT/RU2105/000946, filed on Dec. 29, 2015.

(51) Int. Cl.
*G06F 15/173* (2006.01)
*H04L 29/08* (2006.01)
(Continued)

(52) U.S. Cl.
CPC ...... *H04L 67/1014* (2013.01); *H04L 41/0896* (2013.01); *H04L 43/0876* (2013.01); *H04L 43/16* (2013.01); *H04L 67/02* (2013.01); *H04L 67/1095* (2013.01); *H04L 67/125* (2013.01); *H04L 67/20* (2013.01); *H04L 67/327* (2013.01); *H04L 41/5012* (2013.01)

(58) Field of Classification Search
CPC ............ H04L 67/1014; H04L 67/1327; H04L 43/0876; H04L 43/16

USPC ........................................................ 709/224
See application file for complete search history.

(56) References Cited

U.S. PATENT DOCUMENTS 6,832,248 B1   12/2004   Byrnes
2009/0285094 A1*  11/2009  Straub ............... H04L 29/06027
                                                              370/235

(Continued)

OTHER PUBLICATIONS

Fielding, "Architectural Styles and the Design of Network-based Software Architectures," Dissertation, University of California, Irvine (2000), 180 pages.

(Continued)

*Primary Examiner* — Frantz B Jean
(74) *Attorney, Agent, or Firm* — Fish & Richardson P.C.

(57) ABSTRACT

Methods, systems, and apparatus, including computer programs encoded on a computer storage medium, for estimating distributed consumption of a quota. One of the methods includes receiving, by a first request processing server, a request having one or more specified characteristics; identifying a quota; determining, by the first request processing server, an actual number of requests having the one or more characteristics received by the first request processing server since a most recent synchronization with a parent server; generating, by the first request processing server, a current estimated total number of requests having the one or more characteristics that have been received; determining, by the first request processing server, that the quota has not been reached; and approving, by the first request processing server, the received request.

20 Claims, 4 Drawing Sheets

(51) Int. Cl.
*H04L 12/26* (2006.01)
*H04L 12/24* (2006.01)

(56) References Cited

U.S. PATENT DOCUMENTS

2010/0229218 A1* 9/2010 Kumbalimutt ........ G06F 9/5005
726/4
2017/0161439 A1* 6/2017 Raduchel ............. G06Q 10/063

OTHER PUBLICATIONS

Tilkov, "A Brief Introduction to REST," (Dec. 10, 2007) [online] (retrieved from https://www.infoq.com/articles/rest-introduction), 41 pages.
International Search Report and Written Opinion in PCT/RU2015/000946, dated Aug. 25, 2016, 8 pages.

* cited by examiner

SYSTEM AND METHOD FOR ESTIMATING DISTRIBUTED CONSUMPTION OF A QUOTA

CROSS-REFERENCE TO RELATED APPLICATION

This application is a continuation of and claims priority to PCT Application No. PCT/RU2015/000946, filed on Dec. 29, 2015, the disclosure of which is hereby incorporated by reference in its entirety.

BACKGROUND

This disclosure relates to estimating a distributed consumption of a quota in a networked service provider system.

A service provider system can receive requests from third parties to use a service of the system and can process the requests to provide the service. The system can impose a quota on how many requests are processed. The quota can apply to requests having certain characteristics. The characteristics, such as an identifier of a sender of a request, can be established by the system.

By way of illustration, a service provider system can implement an application programming interface (API), with which third parties, e.g., software developers, can interface. Third parties can utilize services of the system through the API. To communicate with the API, developers send requests with API keys and the service provider system can track and control how the API is being used based on the API key. To prevent abuse, the service provider system can have a quota of a number of times each API key can access the API. For example, the quota can be a total fixed number or a fixed number over a period of time.

SUMMARY

In general, one innovative aspect of the subject matter described in this disclosure can be embodied in methods that include the actions of receiving, by a first request processing server of a plurality of request processing servers, a request having one or more specified characteristics; identifying a quota that specifies a maximum total number of requests that have the one or more specified characteristics that can be approved by all of the plurality of request processing servers; determining, by the first request processing server, an actual number of requests having the one or more characteristics received by the first request processing server since a most recent synchronization with a parent server to obtain a first snapshot identifying a number of requests having the one or more characteristics that have been received by all of the plurality of request processing servers; generating, by the first request processing server, a current estimated total number of requests having the one or more characteristics that have been received by all of the plurality of request processing servers based at least on the actual number of requests received by the first request processing server; determining, by the first request processing server, that the quota has not been reached based at least on the current estimated total; and approving, by the first request processing server, the received request.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination.

The actions can further include receiving, by the first request processing server, a second request having the one or more specified characteristics; generating, by the first request processing server, a second current estimated total number of requests having the one or more characteristics that have been received by all of the plurality of request processing servers since the most recent synchronization based at least on the actual number of requests received by the first request processing server; determining, by the first request processing server, that the quota has been reached based at least on the second current estimated total; and rejecting, by the first request processing server, the received request.

The parent server may a number of times all of the plurality of request processing servers have received requests having the one or more characteristics, and wherein each of the other request processing servers synchronize with the parent server to provide the parent server with a respective number of times the request processing server has received requests having the one or more characteristics.

Generating, by the first request processing server, a current estimated total number of requests can be based on a fill factor that is a ratio of a first rate at which the other request processing servers are receiving requests having the one or more characteristics to a second rate at which the first request processing server is receiving requests having the one or more characteristics.

The actions can further include updating the fill factor, the updating comprising: determining whether the fill factor is increasing or decreasing; if the fill factor is increasing, updating the fill factor according to a first function; and if the fill factor is decreasing, updating the fill factor according to a second function. The first function may be: $y=(1-\sin^6(x/2))*0.5*x$, wherein x is the fill factor and y is the updated fill factor. The second function may be: $y=(\sin^4(x/2)*0.5+0.01)*x$, wherein x is the fill factor and y is the updated fill factor.

Synchronization may occur more frequently as the current estimated total number of requests approaches the quota.

The one or more characteristics may specify an application identifier, a group identifier, and an external identifier, and wherein each unique combination of the application identifier, the group identifier, and the external identifier corresponds to a respective quota.

The details of one or more embodiments of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure generally describes techniques for estimating distributed consumption of a quota in service provider systems, including software platforms. The service provider system receives requests from third party applications, such as developer applications, to use a service of the system and processes the requests to provide the service. The system imposes a quota on how many requests are processed. In some embodiments, the system applies different quota amounts to requests having different characteristics. That is, the system maintains multiple different quotas, with each quota applying to requests having a different set of characteristics or parameters.

In particular, the service provider system can implement an API for developer access with a quota for each request having one or more specified characteristics, e.g., for each developer application or developer application request type. Requests to the API can be distributed to one or more of multiple request processing servers in the service provider system. Each request processing server can estimate how much of the quota has been consumed by the developer application across all of the request processing servers despite not being in real-time communication with the other request processing servers, and can approve or reject requests to the API based on the estimation.

Particular embodiments of the subject matter described in this disclosure can be implemented so as to realize one or more of the following advantages. Overconsumption of the quota can be prevented when the quota is tracked across multiple request processing servers. In particular, a near-actual estimation of the quota can be computed without requiring expending significant resources of having request processing servers in a service provider system be in real-time communication with each other.

Figure 1:
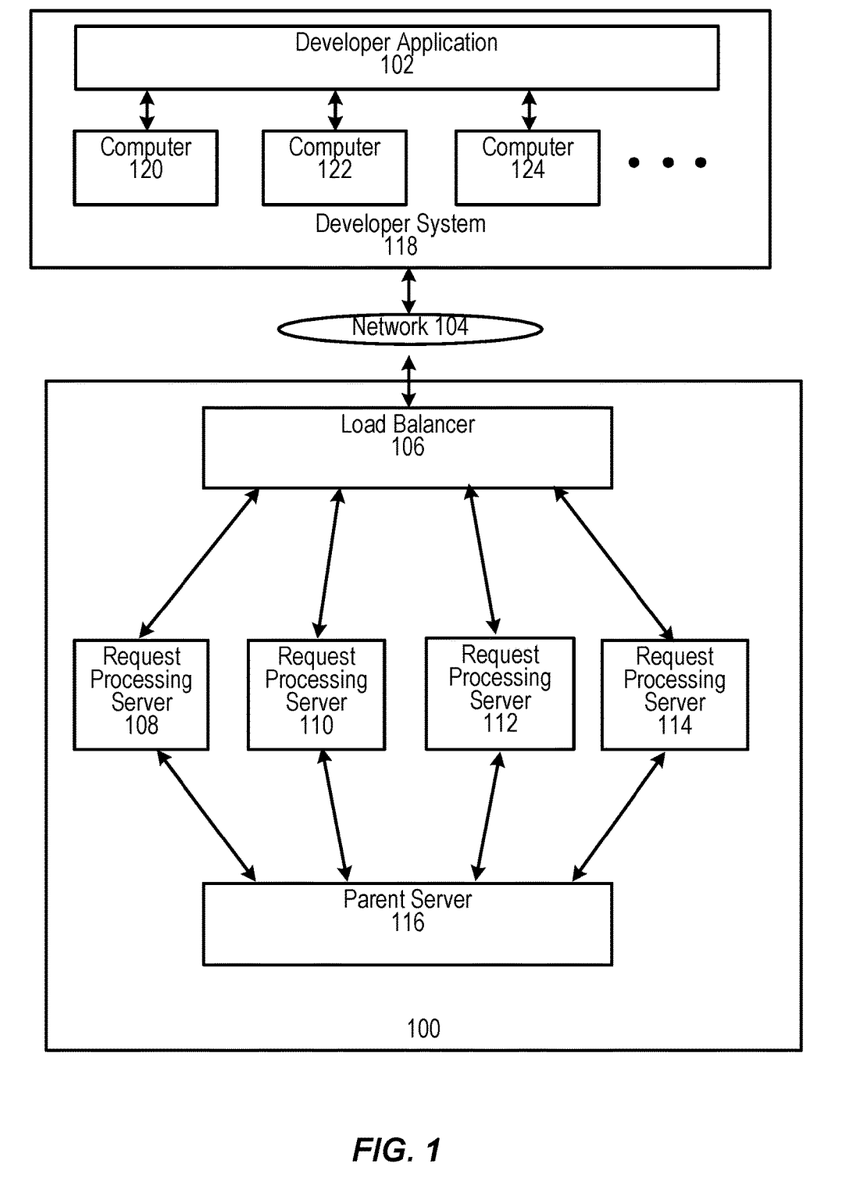
FIG. 1 shows an example system for estimating distributed consumption of a quota.

FIG. 1 shows an example system 100 for estimating distributed consumption of a quota. The system 100 can be implemented as computer programs on one or more computers, e.g. servers, routers, gateways, or the like network equipment, in one or more locations, in which the systems, components, and techniques described herein can be implemented.

The system 100 provides services to users of the system 100 through an API. The API allows developer applications to access functions or services of the system 100. In some examples, the system 100 may be a hosted private branch exchange (PBX) system that provides PBX services that include voice-over-Internet-Protocol (VOIP) telephony services to developer applications using the system through the API. The services provided by the system 100 can also include other kinds of communication instead of or in addition to VOIP telephony services. For example, the communication services provided by the communication service provider system 100 can also include one or more of: short message service (SMS) messaging, faxing, instant messaging, video conferencing, e-mail, and so on.

Developers using the system 100 can deploy an application 102 on one or more computers 120-124 in a developer system 118 maintained by the developers. Each computer can include a memory, e.g., a random access memory (RAM), for storing instructions and data and a processor for executing stored instructions. The memory can include both read only and writable memory. The computers can include electronic devices, for example mobile devices (smartphones, tablet computers, etc.), landline phones (plain old telephone service (POTS) phones or voice-over-Internet Protocol (VOIP) softphones), personal computers, network equipment (servers, routers, gateways, etc.), audio or video conferencing consoles, audio or video conferencing servers, and facsimile (fax) machines. The computers 120-124 on which the developer application 102 is deployed can communicate with the system 100 over a network 104.

The network 104 may be a wired or wireless network, e.g., a local area network (LAN), a wide area network (WAN), or a combination of the two. Though not illustrated, requests from electronic devices intended for the system 100 can be routed through other provider networks (cellular networks, PSTN, wireless networks, etc.) before reaching the network 104.

The system 100 can process requests from multiple developer applications using multiple request processing servers 108-114. When processing a request, e.g., from the developer application 102, the system 100 receives the request at a load balancer 106. The load balancer 106 is one or more one or more computer programs executing one or more computers that redirect the request to one of the request processing servers 108-114 using conventional load balancing techniques, e.g., random choice, round robin, lightest load, and so on.

In some embodiments, it may be desirable to enforce a quota of a number of API requests from the developer application 102. In particular, the system 100 can approve requests for processing until the quota is met, after which the system 100 can reject requests for processing.

There can be different types of quotas. One type of quota specifies a number of requests over a period of time, e.g., per week, per month, or per minute. Another type of quota specifies a maximum number for a particular type of request over all time. For example, the system 100 can establish a maximum number of requests submitted by a unique one of the computers 120-124 to the system 100, e.g., before a user of the unique computer has to register with the system 100. After receiving and processing the maximum number of these requests from the computer, the system 100 can reject all subsequent requests from the computer, e.g., and provide a registration interface for presentation on the computer.

Each request processing server 108-114 can maintain a counter of the number of requests that have been processed by the request processing server to track whether the developer application 102 has exceeded the quota. Generally, a request processing server does not have real-time access to the counters of other request processing servers. Thus, the system 100 includes a parent server 116 to which each request processing server 108-114 periodically synchronizes. Synchronizing will be described further below with reference to FIG. 3. The parent server 116 stores a "snapshot", e.g., in an internal memory, of a total number of requests that have been processed by all of the request processing servers 108-114, and sends the "snapshot" to each of the request processing servers 108-114 during synchronization. The request processing servers 108-114 can use the "snapshot" to, when a new request is received, estimate whether the quota has been exceeded. This will be described below with reference to FIG. 2.

While FIG. 1 describes requests to the system 100 as API requests from a developer application 102, in some embodiments the requests are non-API requests to the system from various devices. For example, a quota can limit a number of requests that have characteristics that identify a particular resource of the system 100.

Figure 2:
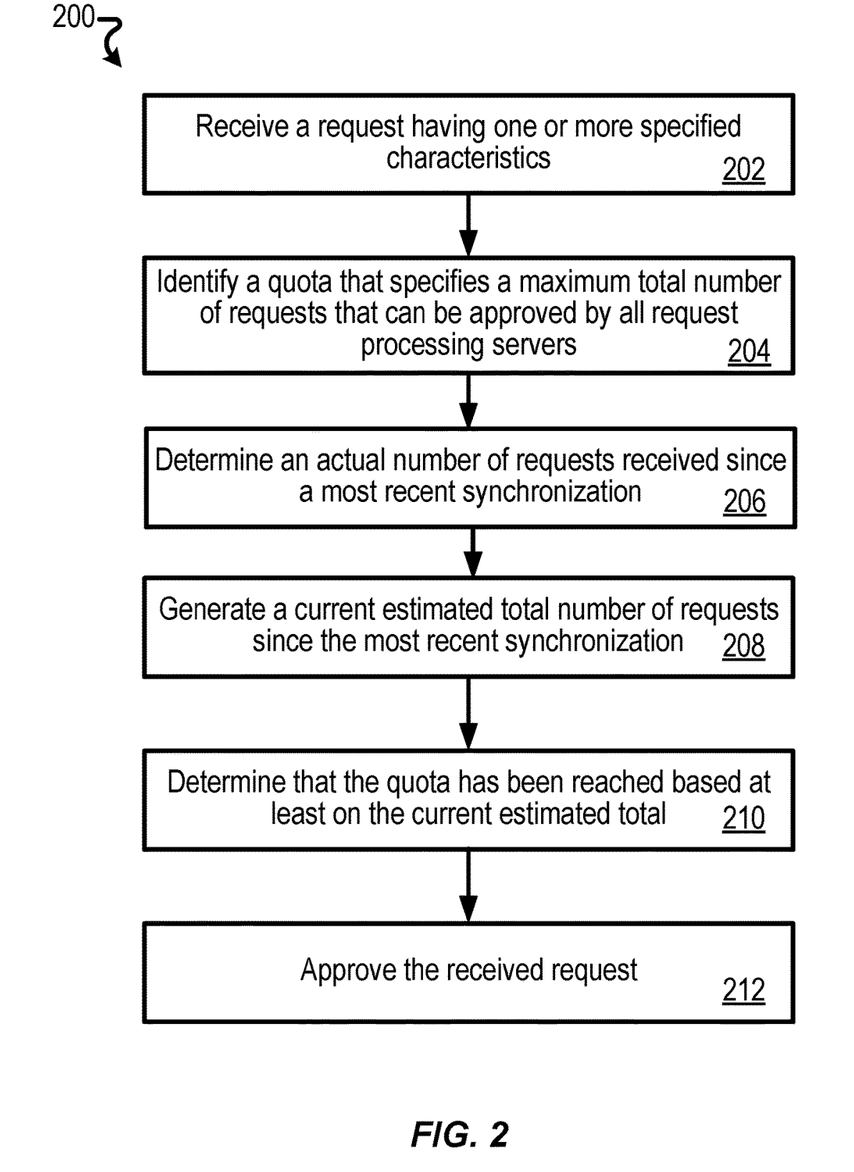
FIG. 2 is a flow diagram of an example process for estimating distributed consumption of a quota.

FIG. 2 is a flow diagram of an example process 200 for estimating distributed consumption of a quota. The process 200 can be performed by a request processing server, e.g., request processing server 108 of FIG. 1, in a system of multiple request processing servers.

At step 202, a request having one or more specified characteristics is received by the request processing server. The characteristics can specify an application identifier, a group identifier, an external identifier, or any combination thereof. The application identifier is an identifier for a third party developer application. For example, the application identifier may be an API key that is assigned to a particular third party develop application for use in communicating with an API implemented by the system. As a particular example, the third party developer application may be a third party telephony or other communication service application that makes use of telephony or other communication services offered by the system by submitting requests to an API implemented by the system using a particular API key. The group and external identifiers can be identifiers used to further identify characteristics of the developer application.

In some example embodiments, each application identifier corresponds to a respective quota. For example, one application identifier can have a quota of one million requests per month while another application identifier can have a quota of twenty thousand requests per month. The quotas may be specified by a system administrator or other user of the system. In some embodiments, the application identifier is associated with a particular account type, e.g., a paid account, which is assigned a respective quota by the system. In some other embodiments, each unique combination of identifiers corresponds to a respective quota.

At step 204, a quota that specifies a maximum total number of requests having the one or more specified characteristics that can be approved by all of the multiple request processing servers in the system is identified.

At step 206, an actual number of requests having the one or more characteristics is determined. In particular, the actual number of requests is a number of requests processed by the request processing server since a most recent synchronization with the parent server. Synchronization provides the request processing server with data specifying how many requests have been approved by all of the request processing servers as of the time of the synchronization. Synchronization will be described further below with reference to FIG. 3. In some embodiments, the request processing server synchronizes with the parent server more frequently as the actual number of requests approaches the quota. For example, the request processing server can synchronize with the parent server when 25%, 50%, 75%, 85%, 90%, 95%, 98%, and 100% of the quota is consumed. As another example, the request processing server can synchronize with the parent server at specified time intervals, with the time intervals getting shorter as the actual number of requests approaches the quota. As yet another example, the request processing server can synchronize with the parent server both when a certain percentage of the quota is consumed and at specified time intervals.

Upon receiving the requests having the one or more characteristics, the request processing server can track the requests in an internal memory. That is, the actual number of requests having the one or more characteristics can be incremented upon the request processing server receiving another request having the one or more characteristics.

At step 208, a current estimated total number of requests having the one or more characteristics that have been received by all of the request processing servers in the system is generated. The current estimated total number of requests can be generated from a fill factor. The fill factor is an estimate of how a first rate at which all of the request processing servers in the system are receiving requests compares to a second rate at which the request processing server is receiving requests. In some implementations, the estimate is a determination of a quotient of the first rate and the second rate. The fill factor can be determined by comparing the number of requests that have been received by all of the request processing servers received during synchronizations with the actual number of requests received by the request processing server. In some embodiments, the fill factor is updated during every synchronization, and each request processing server maintains a respective fill factor. In some embodiments, the fill factor starts at zero. Examples of updating the fill factor will be described further below with reference to FIG. 3.

In some embodiments, the current estimated total number of requests is generated from the actual number of requests received by the request processing server and an estimated number of requests received by the other request processing servers. The estimated number of requests received by the other request processing servers can be computed from a function of the actual number of requests and the fill factor. In some embodiments, the function is a multiplication function. By way of illustration, the current estimated total number of requests can be a sum or a weighted sum of the actual number of requests received since the most recent synchronization and the estimated number of requests received at the other request processing servers.

After the current estimated total is generated, a comparison between the current estimated total and the quota can be performed. That is, a determination is made as to whether or not to approve the request based on whether the current estimated total is less than the quota. If the current estimated total is less than the quota, i.e., step 210, the request processing server can approve the request. If the current estimated total is equal to or greater than the quota, the request processing server can reject the request.

At step 212, the received request is approved in response to the determination that the current estimated total is less than the quota. Upon approval, the request is processed by the request processing server and a portion of the quota is consumed. The request processing server can track the number of received requests that have been processed. If the request processing server receives a subsequent request and determines that the estimated total for the quota has been reached, the request processing server rejects the received request.

In some embodiments, after synchronization with the parent request processing servers, the request processing server has been determined to have approved more requests than the quota allows. This can be determined by the request processing server or the parent server. When this determination occurs, the request processing server is assigned a debt value. The debt value can be a difference between the total number of approved requests and the quota. When the request processing server receives a new quota or the consumed quota is reset, the request processing server can reject a number of requests equal to the debt value. Alternatively, the request processing server can initialize its counter of requests received to the debt value on a subsequent cycle of quota consumption, i.e., when the quota consumed is reset for a next time period. This enables the request processing server to make up for the extra quota consumed on a previous cycle of quota consumption.

In some embodiments, request processing servers are grouped in tiers to scale a large number of requests at the system. For example, the first tier of request processing servers can be request processing servers 108-114 of FIG. 1 and the parent server 116 can be a request processing server in a second tier of request processing servers. The request processing servers in the second tier of request processing servers, i.e., the parent server 116, can receive requests, but also can act as a parent server to, i.e., synchronize with, the request processing servers 108-114. The second tier of request processing servers can then synchronize with a parent server, which keeps track of a total count of all approved requests across the request processing servers. In some embodiments, more than two tiers of request processing servers are used to even further distribute a large of requests processed by the system.

Figure 3:
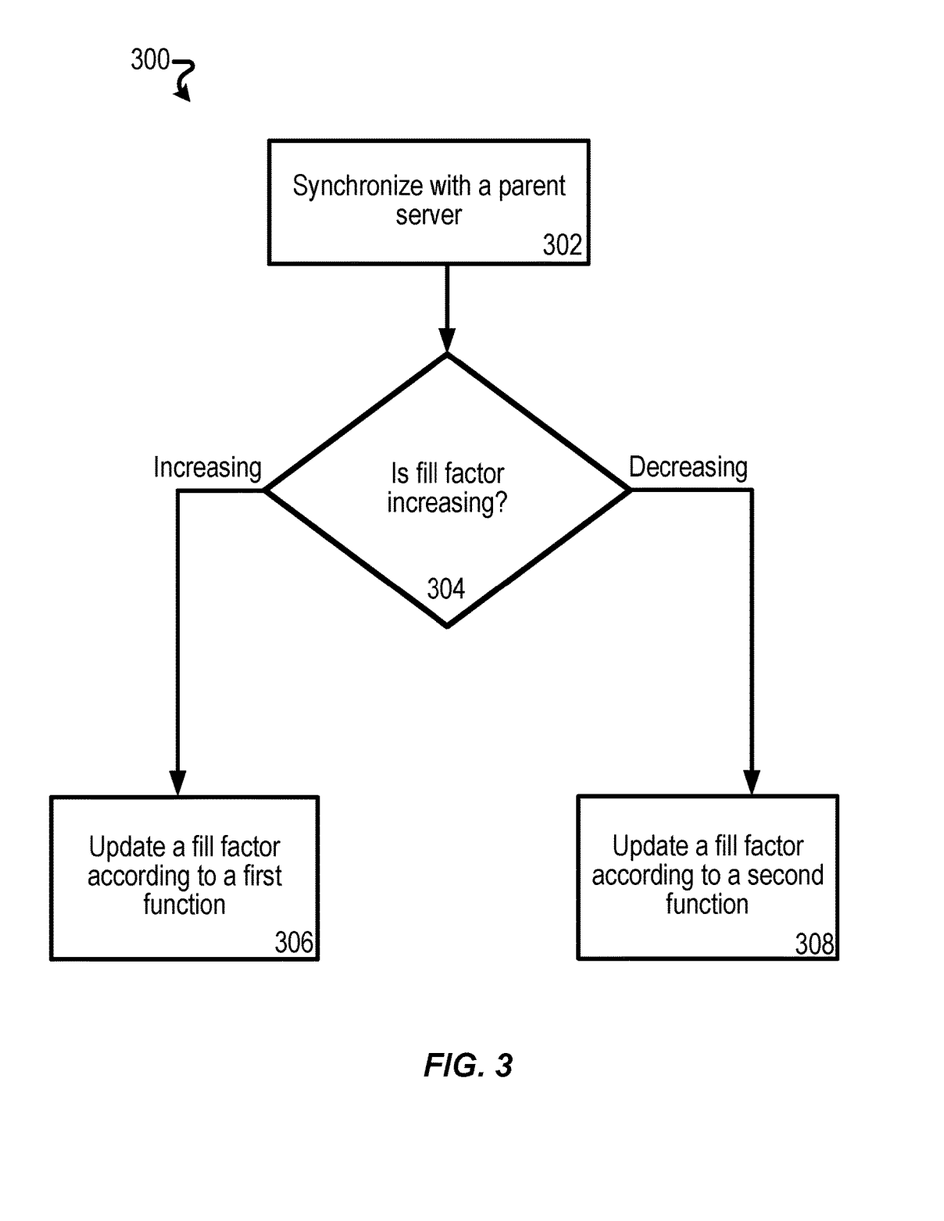
FIG. 3 is a flow diagram of an example process for updating a fill factor.

FIG. 3 is a flow diagram of an example process 300 for updating a fill factor. The process 300 can be performed by a request processing server, e.g., request processing server 108 of FIG. 1, in a system of multiple servers.

At step 302, a parent server, e.g., parent server 116 of FIG. 1, is synchronized with the request processing server. As discussed above, the synchronization can occur periodically. The other request processing servers in the system also periodically synchronize with the parent server. During synchronization with any particular request processing server, the request processing server sends the actual number of requests processed by the request processing server since the most recent synchronization to the parent server and the parent server sends a snapshot to the particular request processing server. The snapshot can identify a number of requests having the one or more characteristics that have been received by all of the request processing servers in the system. Therefore, after synchronization, the particular request processing server has data specifying a total number of requests having the one or more characteristics that have been approved at all of the request processing servers across the entire system since the quota was initiated.

In some embodiments, the parent server is initialized from a first synchronization from any of the multiple request processing servers in the system. That is, the parent server replicates a state of the request processing server at the first synchronization and stores the state in an internal memory. The state includes data specifying the number of requests received by the request processing server. Upon further synchronizations from any request processing server, the parent server updates the state in the internal memory.

After each synchronization, the request processing server can update a fill factor, which is used to generate a current estimated total. The current estimated total is compared to the quota, the result of which determines whether a request is approved or rejected, as described above.

At step 304, the fill factor is determined to be increasing or decreasing. To determine the fill factor, a ratio of a first rate at which all of the request processing servers are receiving requests having the one or more characteristics to a second rate at which the request processing server is receiving requests having the one or more characteristics is determined. The fill factor is determined to be increasing when the ratio is higher than the current fill factor and the fill factor is determined to be decreasing if the ratio is lower than the current fill factor.

If the fill factor is increasing, the fill factor can be updated according to a first function at step 306. If the fill factor is decreasing, a fill factor can be updated according to a second function at step 308. The first function can be a function that causes the fill factor to increase quickly while small and increase more slowly while large. The second function can cause the fill factor to decrease quickly while large and decrease slowly while small. The two functions can be different to slow adjustment of the fill factor over time, which ensures, based on respective current estimated total number of requests, no one request processing server in the system rejects most requests while another request processing server in the system accepts most requests.

An example of the first function is as follows:

$$y=(1-\sin^6(x/2))*0.5*x$$

where x is the fill factor and y is the updated fill factor.

An example of the second function is as follows:

$$y=(\sin^4(x/2)*0.5+0.01)*x$$

where x is the fill factor and y is the updated fill factor.

Figure 4:
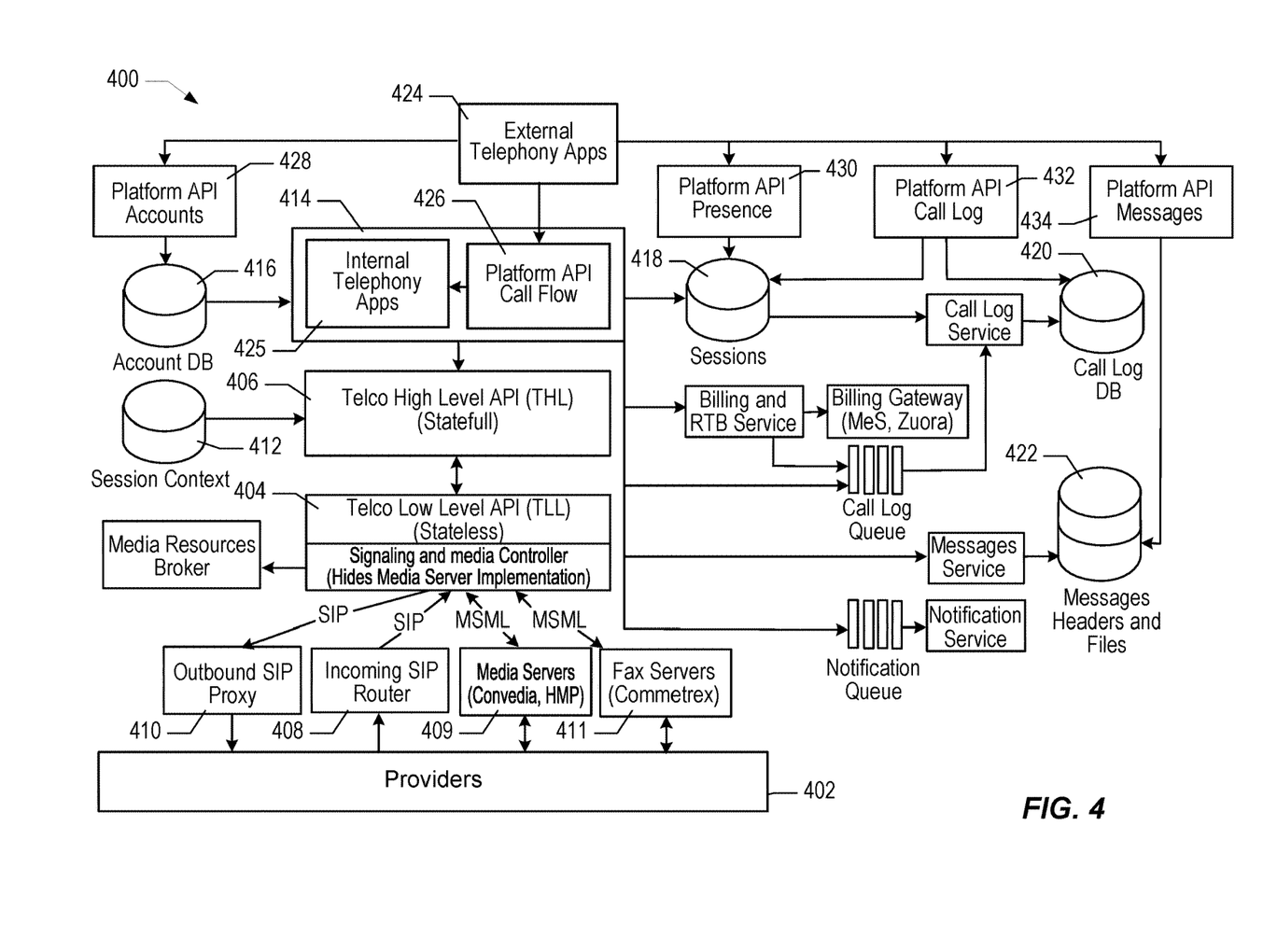
FIG. 4 is a block diagram of an example of a telephony application platform.

FIG. 4 is a simplified block diagram of an example of a PBX platform 400 (such as system 100 of FIG. 1) employing techniques as described herein. PBX platform 400 provides telephony services that allow communication among its users, and between its users and users associated with a variety of external telephony platforms 402 via telecommunication APIs 404 and 406, Outbound SIP Proxy 408, and Inbound SIP Router 410. Media Servers 409 and Fax Servers 411 provide functionality for processing voice over IP and fax over IP data, respectively. Telco API 404 is a stateless low-level API that provides signaling and media telephony primitives including, for example, call answering, placing of outbound calls, creation of conference call objects, addition of calls to conference call objects, playback of media for active calls, recording of active calls, etc. Telco API 406 is a higher-level API that has more sophisticated functionality such as, for example, interactive voice response (IVR), call forwarding, voice mail, etc. In the depicted implementations, telco API 406 doesn't have access to the PBX platforms databases, but maintains session context data 412 to support its functionality. Telco API 406 may include function primitives which can be used to support the development of telephony applications as described herein.

Outbound SIP Proxy 408, and Inbound SIP Router 310 employ the Session Initiation Protocol (SIP), an IETF-defined signaling protocol widely used for controlling communication sessions such as voice and video calls over the Internet Protocol (IP). SIP can be used for creating, modifying and terminating two-party (unicast) or multiparty (multicast) sessions, and may be one of the core protocols employed by systems configured as shown in and described above with reference to FIG. 1. The latest version of the SIP specification is RFC 3261 from the IETF Network Working Group published in June 2002, the entirety of which is incorporated herein by reference for all purposes.

The core functionality of PBX platform 400 (e.g., as described above with reference to FIG. 1) is accessed via telephony services block 414 which has access (not entirely shown for clarity) to the various data repositories of PBX platform 400, i.e., account DB 416, sessions DB 418, call log DB, 420 and message DB 422. Telephony services block 414 receives commands from telephony applications 424 and controls execution of the commands on the PBX platform 400.

In particular, the telephony services block 414 may include multiple request processing servers (such as the request processing servers 108-114) that receive requests, e.g., commands, from the telephony applications and control the execution of the commands on the PBX platform 400. As described above, the multiple request processing servers can each receive requests from the telephony applications 424, determine whether to approve or deny the request and, if approved, process the request.

Telephony services block 414 may also include internal telephony applications 425 that are hosted and/or developed on or in connection with PBX platform 400. The depicted implementation also includes various APIs that allow external telephony applications 424 to interact with PBX platform 400 as described herein. The APIs associated with PBX platform 400 allow telephony applications 424 and 425 to integrate with basic functionality of PBX platform 400 at multiple integration points, to control call flows during execution of the call flows by the platform (e.g., via API 426), and to access platform data (e.g., in DBs 416-422 via APIs 428-434).

For example, the telephony applications may relate to a particular enterprise and might be integrated into call flows for that enterprise at the point where a call is made or received (e.g., enforcing blocked numbers), the company greeting level (e.g., company directory), the department level (e.g., call distribution), or at the individual level (e.g., call handling for individual extensions). And for each integration point, such applications can provide additional options, replace existing options, or augment existing options of the PBX platform functionality. In addition, the script that embodies such options can be hosted externally to the PBX platform, and hand control of call flows back and forth with the platform.

As another example, a script may be created to make calls and play notifications to customers, such as notifications that customer contact information has been changed. A script may also be created to execute as a call is received to determine whether the caller is on a user's dynamic list of blocked numbers, and if so, to terminate the call. A script may be created to execute at the company greeting level to play dynamic customer alerts that are hosted on a user's own system and not the PBX platform, such as customer-specific messages (e.g., based on caller ID), holiday alerts, or dynamic advertisements. Other scripts may be created at the company greeting level to enable a customized company directory, such as a company directory that uses natural language processing to determine the correct department or individual to answer the call (e.g., "How may I help you?" prompt) or a multiple level interactive voice response ("IVR") menu. A script may be created to execute at the department level to implement customized rules for distributing calls, such as company-specific rules for selecting customer service agents from a queue. A script may be created to execute at the individual level to implement customized greetings, such as an unavailability greeting based on the individual's calendar or other presence information, or to implement customized call screening or voicemail dialogs. The foregoing examples serve to illustrate the great diversity of telephony functionality that may be provided according to the techniques describe herein.

A telephony application script may return control of a call flow back to the application that called the script, such as the default application provided by the PBX platform or a script that called the current script, either after the current script has executed or at any point in the current script, such as upon the occurrence of a condition defined in the current script. In some implementations, part or all of the default application provided by the PBX platform may be exposed as a script to allow for a large number of integration points and flexible customization of the PBX platform.

According to a particular class of implementations, APIs having the functionalities described herein are implemented using the JavaScript Object Notation (JSON) data format described in RFC 4627 dated July 2006, the entirety of which is incorporated herein by reference for all purposes. This class of implementations is also implemented in accordance with at least some of the guiding principles embodied by the REST (REpresentational State Transfer) computing paradigm. The currently evolving notion of a "RESTful" system is based on the doctoral dissertation of Roy Thomas Fielding entitled *Architectural Styles and the Design of Network-based Software Architectures*, University of California, Irvine (2000), the entirety of which is incorporated herein by reference for all purposes. Although there is, as of yet, no ratified standard, a RESTful system generally observes a set of principles that define how Web standards such as HTTP and URLs may be used to facilitate heterogeneous application-to-application communication. Generally speaking, REST relates to resource-based systems in which URLs refer to the resources and HTTP methods are used to manipulate these resources. For additional information on RESTful systems, please refer to *A Brief Introduction to REST* posted by Stefan Tilkov on infoq.com on Dec. 10, 2007, the entirety of which is incorporated herein by reference for all purposes.

According to a specific class of implementations, the APIs define specific sets of responses for an application's various software components to the HTTP methods. That is, the APIs define sets of rules for how they and the various software components with which they interact operate on the contents of a query for each of the different methods. According to a particular implementation, the HTTP methods include the following:

"call"—Dial specified telephone number or SIP address

"conference"—Initiate or connect to specified conference

"end"—End current call

"if"—Define a condition (e.g., response, DTMF tone) to execute set of commands or script "info"—Return session information (e.g., voice/fax/text, caller/account ID(s), to/from phone number(s), SIP address (es))

"play"—Play specified recording or phrase

"prompt"—Play specified recording or phrase and receive response

"record"—Record one or more channels of current call

"receive"—Initiate the receiving of fax, text, or other message data over current call "redirect"—Redirect incoming call to company, department, or individual user (e.g., using name, phone number, extension, or SIP address)

"reject"—Reject incoming call

"result"—Return result of previous command (e.g., response to prompt, success/failure of command)

"script"—Run specified script

"send"—Send fax, text, or other message data over current call

"return"—Return control of call flow back to default or previous application

"transfer"—Transfer current call to company, department, or individual user (e.g., using name, phone number, extension, or SIP address)

"wait"—Wait a specified period of time before continuing execution of call flow

It will be understood that a wide range of other HTTP methods may be created or used, and that the foregoing list of HTTP methods should therefore not be used to limit the scope of the present invention Telephony applications 424 and 425 may provide a wide range of simple to highly complex functionality that enhances, augments, or replaces the functionality provided by PBX platform 400. Examples of areas of functionality include, but are not limited to, interactive voice response functionality, call center functionality, call statistics functionality, voice mail functionality, call blocking functionality, etc. In some implementations, media processing may be performed by servers hosted by telephony application developer and not PBX platform 400, for example, to perform customized automatic speech recognition or natural language processing for calls, after which control may be passed back to PBX platform 400, Virtually any telephony functionality that can be imagined by developers and integrated with a PBX platform may be supported.

As mentioned above, telephony applications 425 may be developed and/or hosted on PBX platform 400. For example, platform 400 may include an application developer environment (not shown) in which developers (who may be agents of, the platform provider, existing platform customers, or independent developers) design and deploy telephony applications. Alternatively, telephony applications 424 may be developed and/or hosted on other platforms independent of PBX platform 400. PBX platform 400 may also include a telephony application store (not shown) in which telephony applications (e.g., 424 and/or 425) are made available for purchase to customers of PBX platform 400.

According to some implementations, the telephony application store can offer advanced billing and analytics functionality based on the telephony applications' integration with PBX platform 400. While traditional application stores provide fixed billing based on a purchased application, the telephony application store may provide alternative billing based on the purchasers of telephony applications who may also be PBX platform subscribers. For example, the telephony application store may provide subscription billing corresponding to subscription billing for PBX platform 400, customized billing based on the number of individuals (e.g., employees of an enterprise customer) under a user account (e.g., a company account) or the number of telephone numbers under a user account, or usage billing based on usage of the telephony application or PBX platform 400 (e.g., number of callers, minutes used, storage used). In addition, because the telephony applications may be based on API calls processed by the PBX platform, a telephony application store integrated with PBX platform 400 can offer advanced analytics detailing usage of the telephony applications, such as call flow statistics and caller statistics.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this disclosure can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this disclosure contains many specific implementation details, these should not be construed as limitations on the scope of the present disclosure or of what may be claimed, but rather as descriptions of features specific to particular embodiments of the present disclosure. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, by a first request processing server of a plurality of request processing servers, a request having one or more specified characteristics;
identifying a quota that specifies a maximum total number of requests that have the one or more specified characteristics that can be approved by all of the plurality of request processing servers;
determining, by the first request processing server, an actual number of requests having the one or more characteristics received by the first request processing server since a most recent synchronization with a parent server to obtain a first snapshot identifying a number of requests having the one or more characteristics that have been received by all of the plurality of request processing servers;
generating, by the first request processing server, a current estimated total number of requests having the one or more characteristics that have been received by all of the plurality of request processing servers based at least on the actual number of requests received by the first request processing server;
determining, by the first request processing server, that the quota has not been reached based at least on the current estimated total; and
approving, by the first request processing server, the received request.

2. The method of claim 1, further comprising:
receiving, by the first request processing server, a second request having the one or more specified characteristics;
generating, by the first request processing server, a second current estimated total number of requests having the one or more characteristics that have been received by all of the plurality of request processing servers since the most recent synchronization based at least on the actual number of requests received by the first request processing server;
determining, by the first request processing server, that the quota has been reached based at least on the second current estimated total; and
rejecting, by the first request processing server, the received request.

3. The method of claim 1, wherein the parent server stores a number of times all of the plurality of request processing servers have received requests having the one or more characteristics, and wherein each of the other request processing servers synchronize with the parent server to provide the parent server with a respective number of times the request processing server has received requests having the one or more characteristics.

4. The method of claim 1, wherein generating, by the first request processing server, a current estimated total number of requests is based on a fill factor that is a ratio of a first rate at which the other request processing servers are receiving requests having the one or more characteristics to a second rate at which the first request processing server is receiving requests having the one or more characteristics.

5. The method of claim 4, further comprising updating the fill factor, the updating comprising:
determining whether the fill factor is increasing or decreasing;
if the fill factor is increasing, updating the fill factor according to a first function; and
if the fill factor is decreasing, updating the fill factor according to a second function.

6. The method of claim 5, wherein the first function is:

$$y=(1-\sin^6(x/2))*0.5*x$$

wherein x is the fill factor and y is the updated fill factor.

7. The method of claim 5, wherein the second function is:

$$y=(\sin^4(x/2)*0.5+0.01)*x$$

wherein x is the fill factor and y is the updated fill factor.

8. The method of claim 1, wherein synchronization occurs more frequently as the current estimated total number of requests approaches the quota.

9. The method of claim 1, wherein the one or more characteristics specify an application identifier, a group identifier, and an external identifier, and wherein each unique combination of the application identifier, the group identifier, and the external identifier corresponds to a respective quota.

10. A system comprising:
a plurality of request processing servers, wherein each of the plurality of request processing servers is configured to perform operations comprising:
receiving a request having one or more specified characteristics;
identifying a quota that specifies a maximum total number of requests that have the one or more specified characteristics that can be approved by all of the plurality of request processing servers;
determining an actual number of requests having the one or more characteristics received by the first request processing server since a most recent synchronization with a parent server to obtain a first snapshot identifying a number of requests having the one or more characteristics that have been received by all of the plurality of request processing servers;
generating a current estimated total number of requests having the one or more characteristics that have been received by all of the plurality of request processing servers based at least on the actual number of requests received by the first request processing server;
determining that the quota has not been reached based at least on the current estimated total; and
approving the received request.

11. The system of claim 10, the operations further comprising:
receiving a second request having the one or more specified characteristics;
generating a second current estimated total number of requests having the one or more characteristics that have been received by all of the plurality of request processing servers since the most recent synchronization based at least on the actual number of requests received by the first request processing server;
determining that the quota has been reached based at least on the second current estimated total; and
rejecting the received request.

12. The system of claim 10, the operations further comprising:
the parent server, wherein the parent server stores a number of times all of the plurality of request processing servers have received requests having the one or more characteristics, and wherein each of the other request processing servers synchronize with the parent server to provide the parent server with a respective number of times the request processing server has received requests having the one or more characteristics.

13. The system of claim 10, wherein generating, by the first request processing server, a current estimated total number of requests is based on a fill factor that is a ratio of a first rate at which the other request processing servers are receiving requests having the one or more characteristics to a second rate at which the first request processing server is receiving requests having the one or more characteristics.

14. The system of claim 13, the operations further comprising updating the fill factor, the updating comprising:
determining whether the fill factor is increasing or decreasing;
if the fill factor is increasing, updating the fill factor according to a first function; and
if the fill factor is decreasing, updating the fill factor according to a second function.

15. The system of claim 14, wherein the first function is:

$$y=(1-\sin^6(x/2))*0.5*x$$

wherein x is the fill factor and y is the updated fill factor.

16. The system of claim 14, wherein the second function is:

$$y=(\sin^4(x/2)*0.5+0.01)*x$$

wherein x is the fill factor and y is the updated fill factor.

17. The system of claim 10, wherein synchronization occurs more frequently as the current estimated total number of requests approaches the quota.

18. The system of claim 10, wherein the one or more characteristics specify an application identifier, a group identifier, and an external identifier, and wherein each unique combination of the application identifier, the group identifier, and the external identifier corresponds to a respective quota.

19. A computer program product encoded on one or more non-transitory computer storage media, the computer program product comprising instructions that when executed by one or more computers cause the one or more computers to perform operations comprising:
receiving, by a first request processing server of a plurality of request processing servers, a request having one or more specified characteristics;
identifying a quota that specifies a maximum total number of requests that have the one or more specified characteristics that can be approved by all of the plurality of request processing servers;
determining, by the first request processing server, an actual number of requests having the one or more characteristics received by the first request processing server since a most recent synchronization with a parent server to obtain a first snapshot identifying a number of requests having the one or more characteristics that have been received by all of the plurality of request processing servers;
generating, by the first request processing server, a current estimated total number of requests having the one or more characteristics that have been received by all of the plurality of request processing servers based at least on the actual number of requests received by the first request processing server;
determining, by the first request processing server, that the quota has not been reached based at least on the current estimated total; and
approving, by the first request processing server, the received request.

20. The computer program product of claim 19, the operations further comprising:
receiving, by the first request processing server, a second request having the one or more specified characteristics;
generating, by the first request processing server, a second current estimated total number of requests having the one or more characteristics that have been received by all of the plurality of request processing servers since the most recent synchronization based at least on the actual number of requests received by the first request processing server;
determining, by the first request processing server, that the quota has been reached based at least on the second current estimated total; and rejecting, by the first request processing server, the received request.

* * * * *

UNITED STATES PATENT AND TRADEMARK OFFICE
CERTIFICATE OF CORRECTION

PATENT NO. : 10,225,334 B2
APPLICATION NO. : 15/224424
DATED : March 5, 2019
INVENTOR(S) : Dmitry Sergeevich Cherepanov et al.

It is certified that error appears in the above-identified patent and that said Letters Patent is hereby corrected as shown below:

On the Title Page

Column 1, (63) Related U.S. Application Data, Line 2: delete "PCT/RU2105/000946" and insert --PCT/RU2015/000946--, therefor.

Signed and Sealed this
Thirtieth Day of April, 2019

Andrei Iancu
*Director of the United States Patent and Trademark Office*